United States Patent [19]

Rainville

[11] Patent Number: 5,035,383
[45] Date of Patent: Jul. 30, 1991

[54] SPACE SAVER SERVICE CLAMP

[75] Inventor: Gilles A. Rainville, Northridge, Calif.

[73] Assignee: Rockwell International Corporation, El Segundo, Calif.

[21] Appl. No.: 445,141

[22] Filed: Dec. 4, 1989

Related U.S. Application Data

[63] Continuation of Ser. No. 311,262, Feb. 16, 1989, abandoned.

[51] Int. Cl.⁵ ............................................. F16L 3/00
[52] U.S. Cl. .................................. 248/68.1; 248/74.3
[58] Field of Search ................... 248/68.1, 69, 74.3; 24/279, 335, 339

[56] References Cited

U.S. PATENT DOCUMENTS

| | | | |
|---|---|---|---|
| 1,355,862 | 10/1920 | Spellman | 248/68.1 |
| 1,672,720 | 6/1928 | Horsfall | 248/68.1 X |
| 2,470,814 | 5/1949 | Hain | 248/68.1 |
| 2,577,120 | 12/1951 | Franz | 248/68.1 X |
| 2,622,123 | 12/1952 | Eakin | 248/68.1 X |
| 3,095,042 | 6/1963 | Clark, Jr. et al. | 248/68.1 X |
| 3,486,725 | 12/1969 | Hidassy | 248/74.3 X |
| 4,148,113 | 4/1979 | Dvorachek | 24/335 X |
| 4,179,774 | 12/1979 | Bradbury | 248/68.1 X |
| 4,467,987 | 8/1984 | Small | 248/68.1 |
| 4,550,891 | 11/1985 | Schaty | 248/68.1 |
| 4,605,059 | 8/1986 | Page | 248/68.1 X |
| 4,682,747 | 7/1987 | King, Jr. et al. | 248/68.1 |
| 4,864,697 | 9/1989 | Sparks | 248/68.1 X |

FOREIGN PATENT DOCUMENTS

| | | | |
|---|---|---|---|
| 451510 | 8/1950 | Italy | 24/339 |
| 933929 | 8/1963 | United Kingdom | 248/74.3 |

Primary Examiner—David L. Talbott
Attorney, Agent, or Firm—Charles T. Silberberg; Harold C. Weston; Terrell P. Lewis

[57] ABSTRACT

A clamp assembly for efficient mounting of wire bundles, hydraulic tubing and other extended service conduits is comprised of a unitary support plate having a triad of support clamp elements formed of strong, resilient metal or plastic with appropriately sized securable openings and means for attaching it to structure in confined or space critical areas or volumes.

11 Claims, 1 Drawing Sheet

SPACE SAVER SERVICE CLAMP

This is a continuation of copending application Ser. No. 311,262 filed on 2/16/89 now abandoned.

BACKGROUND OF THE INVENTION

This invention relates to clamps, and more particularly to clamps used for mounting wire harnesses, fluid tubing and wave guides (hereafter "service conduits") to supporting structure of aircraft, spacecraft, missiles or other creations where space and weight conservation and reliability maximization are prime concerns.

Spacecraft and aircraft require large numbers of wire bundles and operational tubing for proper operation of their internal systems. Support of the same always entails maximum security against shock and vibration at minimal costs of weight and volume throughout their structure. Conventional system design calls for a variety of secureable, flexible strap elements to be placed around the service conduit and bolted to structure at any convenient support member.

Typical of such conventional elements are those of Design Pat. No. 269,155 to W. T. Rose, U.S. Pat. No. 3,016,441 to A. W. Hackman or U.S. Pat. No. 4,148,113 to H. A. Dvoracheck for clamp means. All of these, and other devices in common use throughout the aerospace field, lack the features of compact design and space saving positive support provided by the within invention. Confined spaces in high performance fighter aircraft demand reliable, secure attachment of wire bundles and hydraulic lines with maximal utilization of limited volumes available. The within unit meets this demand by providing a highly reliable, single piece, triple support clamp with appropriate attachment provisions for securement of the clamp (and so, its conduits) to vehicle structure.

By supporting three service conduits with the unitary clamp, appreciable time and effort are conserved with mounting the single clamp to structure as opposed to the plurality required, one for each service conduit, in conventional systems. Design of the new service clamp is amenable to a variety of sizings and applications variants for different sized conduits while preserving the mounting provisions, (viz. nutplates or bolt holes in vehicle structure) and standardizing final assembly procedures. Accessibility to service conduits is much easier with the new clamp since operating volume space is minimized by the triangular array and access to any of the three service conduits can be achieved without disturbances to clamp mounting bolts or to other nearby conduits.

Discovery of this new clamp was made during research into high performance experimental fighter aircraft and it has been found to be a sound solution to the reliability and space/weight economics demanded by such vehicles.

Accordingly, it is an object of this invention to provide a highly reliable, space saving service conduit clamp, useable in high vibration, high acceleration environments at economies in manufacture and installation efforts for aerospace vehicles or other confined installations.

SUMMARY OF THE INVENTION

The above objective is best achieved by stamping or moulding a metallic or resilient plastic plate with a triad of strap elements having securement or closure means across the entry lips of the straps. These closure means are not part of the invention but could consist of nut/bolt combinations or tie straps or even removable crimp means to secure the service conduit after the clamp has been attached to vehicle structure.

The clamp must be provided with mounting means which could be simple bolt holes or nut plates for attachment to stringers and bulkheads. Bonding cement could be used to secure the base to structure and the purpose of the invention would be achieved.

In general, the clamp has three circular straps, the diameters of which are selectable at clamp fabrication. Generally too, these circular straps will be arrayed in a triangle as cutouts from a sheet of resilient plastic or metal such as stainless steel or some other strong, bendable material. Since the more massive conduits should be kept closer to their support means, where different sized conduits are provided for, the three cutouts would be made with the smaller one at the apex of the triangle. This is not a compelling consideration but should be a design consideration for users of the invention. Bulkier wire bundles should be run close to structure while hydraulic lines of a smoother, more defined configuration, are advantageously supported by the cutout closest to the triangle's apex.

Mounting bases may consist of tabs at right angle to the plane of the cutouts or could be designed into the same plane as such cutouts, depending on the available structure. Actual attachment to structure could be made with bolts, nutplates or even cements of appropriate type.

DETAILED DESCRIPTION OF A PREFERRED EMBODIMENT

Figure 1:
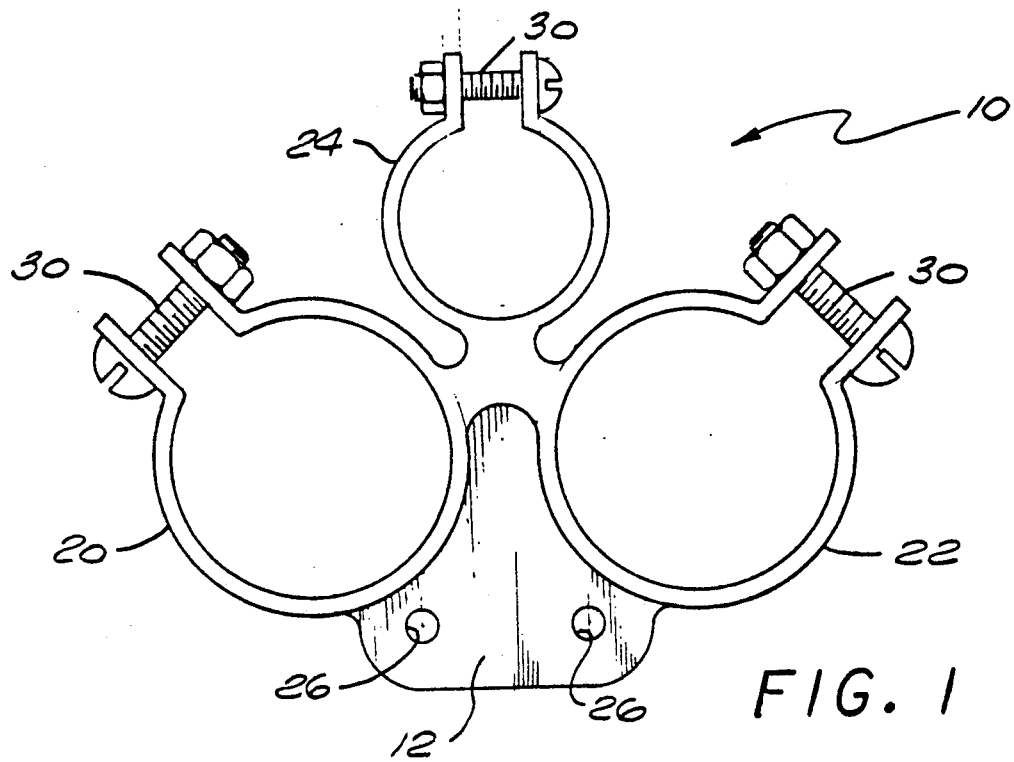
FIG. 1 is a planar view of the triple clamp of this invention for radial mounting.
Figure 2:
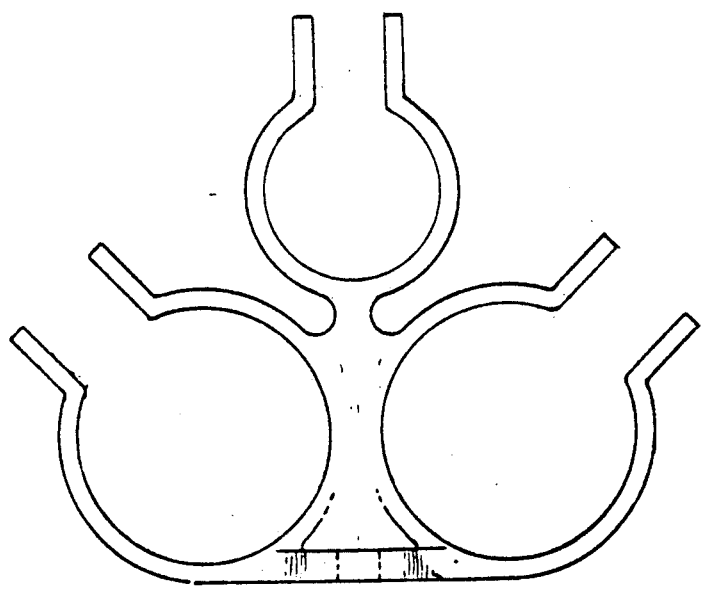
FIG. 2 is the clamp of FIG. 1 for stringer mounting.
Figure 3:
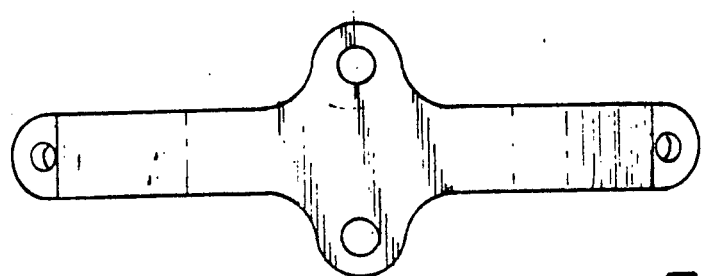
FIG. 3 is a bottom view of the clamp of FIG. 2.

FIG. 1 presents an operating systems service conduit clamp 10 with conduit straps 20, 22 and 24 arrayed in triangular fashion on its base 12. Size of straps 20, 22 or 24 is at the discretion of the designer depending on the size of service conduits to be supported. Optimal design would provide that the more massive or bulkier of the conduits be fixed to straps at the base 12 of the triangular array space saving is achieved by nesting strap 24 in the upper volume between straps 20 and 22 (see FIGS. 1,2). As used herein the word "nesting" implies positioning of support element 24 in the spatial volume immediately adjacent the nearest placement of elements 20 and 22 in the array. The volume so occupied by element 24 comprises the "space saving" implied in the title of this disclosure.

Mounting holes 26 in base 12 can be standardized in size and spacing to facilitate the coupling of clamp 10 to vehicle structure. A common template can be used for size and spacing of holes 26 or nut plates can be fixed to either structure or clamps to facilitate assembly of systems. Closure means 30 are secured to their support straps after service conduits have been inserted.

A normal installation of service conduit clamps would entail drilling support holes in vehicle structure by means of a template. Uniformity of drill hole spacing helps prevent damages or misdrillings and the associated repairs or replacement of structure.

Clamps 10 are then secured to structure by provisions at holes 26 and straps 20, 22 and 24 expanded to accept their respective conduits. Closure means 30 are used to secure strap openings and the installation is complete. Gaskets, or bundle wraps, or tubing pads may be used to advantage with some types of service conduit.

Support base 12 may be secured to vehicle structure by any convenient means, the general one being nuts and bolts or nut plates and securing bolts. Special bonding agents are also useable with this clamp where mounting does not allow for drill holes.

Support straps 20, 22 and 24 may be comprised of flexible metal such as stainless steel or other, which flexes sufficiently to accept the service conduit and still provides positive support when closed with closure means 30. Closure means 30 may be a nut-bolt combination, string tie or plastic strapping. All means to secure the arms of the strap from opening and so releasing the service conduit from positive restraint is contemplated hereby.

Key advantage of the within clamp resides in its ability to maximize useable volume of congested vehicle structure for compact array of service conduits. The triangular array provides for secure carriage of such conduits as hydraulic or pneumatic services on top of other, bulkier conduits, with minimal disturbance to vehicle structure from drill holes, nut plates, etc.

I claim:

1. A space saving operating system service conduit clamp comprising a triangular array of three resilient, circular strap elements and a base plate, each of said strap elements being configured to provide positive restraint for a single operating system service conduit, one of such strap elements being nested in a volume between portions of the other two such elements of said triangular array, said strap elements in said array being unitary with one another and with said base plate, and said base plate having attachment means for coupling said clamp to structure associated with said operating system.

2. The clamp of claim 1 wherein said support strap elements are formed with said base plate from resilient plastic as a unitary item.

3. The clamp of claim 1 wherein said strap elements are comprised of flexible metal.

4. The clamp of claim 1, wherein each of said strap elements are arcuate about an axis with said axes of said elements being substantially parallel, said portions of said strap elements forming a single unitary member extending substantially parallel with said axes and normal to said base plate.

5. The clamp of claim 1 wherein said support straps and base plate are designed to support different sizes of service conduit, the larger of which are supported by strap elements at the base of said triangular array.

6. The clamp of claim 1 wherein each of said strap elements has closure means.

7. A clamp for securing a plurality of wires, tubing or other similar types of service conduits to a surface, comprising:
a support base including a mounting portion and a supporting portion,
said mounting portion having means for securing said base to a surface, and
said supporting portion including
a triangular array of positive restraint, resilient, strap elements, one of such strap elements being nested in a volume between portions of the other two such elements of the triangular array, and
means, formed integrally with the periphery of at least two of said strap elements, for interconnecting said strap elements with said supporting portion and said base,
said supporting portion, said mounting portion, said array of strap elements and said interconnecting means all being formed as a single unitary member.

8. The clamp of claim 7, wherein said supporting portion comprising an elongated portion having an axis of extent, and each of said strap elements being arcuate and delimiting a substantially cylindrical volume having an axis of symmetry, said axis of extent and said axes of symmetry being substantially parallel to one another.

9. The clamp of claim 7, wherein said supporting portion comprising an elongated portion having an axis of extent, and each of said strap elements being arcuate and delimiting a substantially cylindrical volume having an axis of symmetry, said axis of extent and said axes of symmetry being substantially perpendicular to one another.

10. The clamp of claim 7, wherein said interconnecting means is formed integrally with the periphery of each of said strap elements.

11. The clamp of claim 7, wherein each of said strap elements in said array comprises a single resilient arcuate band of material, and said interconnecting means is formed integrally with the arcuate band of each of the said strap element.

* * * * *